US007755006B2

(12) United States Patent
Jones et al.

(10) Patent No.: US 7,755,006 B2
(45) Date of Patent: Jul. 13, 2010

(54) HEATING SYSTEMS AND METHODS FOR A COOKING APPLIANCE

(75) Inventors: Deborah Joan Jones, Jeffersonville, IN (US); Bonnie W. Heinze, Louisville, KY (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 11/633,812

(22) Filed: Dec. 5, 2006

(65) Prior Publication Data

US 2008/0128403 A1 Jun. 5, 2008

(51) Int. Cl.
*A21B 1/40* (2006.01)
*H05B 1/02* (2006.01)

(52) U.S. Cl. ....................... 219/412; 219/492; 219/494; 99/332; 99/333

(58) Field of Classification Search ....................... None
See application file for complete search history.

(56) References Cited

U.S. PATENT DOCUMENTS 4,301,509 A * 11/1981 Haase et al. ................ 700/300
4,692,597 A * 9/1987 Tsuda et al. ................ 219/492
5,001,329 A 3/1991 Shimomura et al.
5,182,439 A * 1/1993 Burkett et al. ............... 219/412
5,426,280 A 6/1995 Smith
5,454,427 A * 10/1995 Westbrooks et al. ........ 165/267
5,582,755 A 12/1996 Maher, Jr. et al.
5,653,906 A * 8/1997 Fowler et al. ............... 219/716
5,662,025 A 9/1997 Yoo
5,809,994 A 9/1998 Maher, Jr.
5,827,556 A 10/1998 Maher, Jr.
5,877,477 A * 3/1999 Petty et al. .................. 219/506
5,981,916 A 11/1999 Griffiths et al.
6,427,581 B1 8/2002 Wu
6,573,483 B1 6/2003 DeCobert et al.
6,809,301 B1 * 10/2004 McIntyre et al. ............ 219/506
6,812,433 B1 * 11/2004 Barritt ........................ 219/413
6,881,055 B2 4/2005 Bird
7,105,779 B2 * 9/2006 Shei ........................... 219/413
7,109,444 B2 * 9/2006 Levy et al. .................. 219/492

* cited by examiner

*Primary Examiner*—Joseph M Pelham
(74) *Attorney, Agent, or Firm*—George L. Rideout, Esq.; Armstrong Teasdale LLP

(57) ABSTRACT

A heating system for a cooking appliance includes at least one heating element positioned within a cooking cavity defined by a cabinet of the cooking appliance. The cooking cavity is configured to support a food item therein during a cooking process. A controller is in operational control communication with the at least one heating element. The controller is configured to energize the at least one heating element to operate a slow cook mode for cooking the food item.

20 Claims, 4 Drawing Sheets

HEATING SYSTEMS AND METHODS FOR A COOKING APPLIANCE

BACKGROUND OF THE INVENTION

This invention relates generally to cooking appliances and, more particularly, to heating systems and methods for cooking food items in a slow cook mode.

Conventional cooking appliances, including ranges and ovens, have a cabinet that defines a cooking cavity within which food items are placed. A plurality of heating elements are positioned within the cooking cavity for heating the food items. With conventional cooking appliances, if a consumer desires to slow cook a food item for a relatively long time period, such as about 2 hours to about 9 hours, a crock pot or similar stand-alone cooking appliance is required.

Some conventional ovens include a programmed cooking algorithm to cook the food item without the supervision of the consumer during the cooking process. However, such conventional ovens may not slow cook the food item. For example, the conventional ovens may not start cooking a food item in the morning, and continuously cook the food item during the day, while the consumer is working, such that the food item is completely cooked by the time the consumer returns home.

BRIEF DESCRIPTION OF THE INVENTION

In one aspect, a heating system for a cooking appliance is provided. The cooking appliance includes a cabinet defining a cooking cavity. The cooking cavity is configured to support a food item therein during a cooking process. The heating system includes at least one heating element positioned within the cooking cavity, and a controller in operational control communication with the at least one heating element. The controller is configured to energize the at least one heating element to operate a slow cook mode for cooking the food item.

In another aspect, a cooking appliance is provided. The appliance includes a cabinet at least partially defining a cooking cavity. The cooking cavity is configured to support a food item therein during a cooking process. At least one heating element is positioned within the cooking cavity. A temperature sensor is positioned with respect to the cooking cavity and configured to detect a temperature within the cooking cavity. A controller is operatively coupled to the at least one heating element and the temperature sensor. The controller is configured to energize the at least one heating element to operate a slow cook mode for cooking the food item within the cooking cavity.

In another aspect, a method for operating a cooking appliance is provided. The method includes providing a cabinet at least partially defining a cooking cavity. The cooking cavity is configured to receive a food item therein and positioning at least one heating element within the cooking cavity and operatively coupling a controller to the at least one heating element. The controller is configured to energize the at least one heating element to operate a slow cook mode for cooking the food item within the cooking cavity.

DETAILED DESCRIPTION OF THE INVENTION

Figure 1:
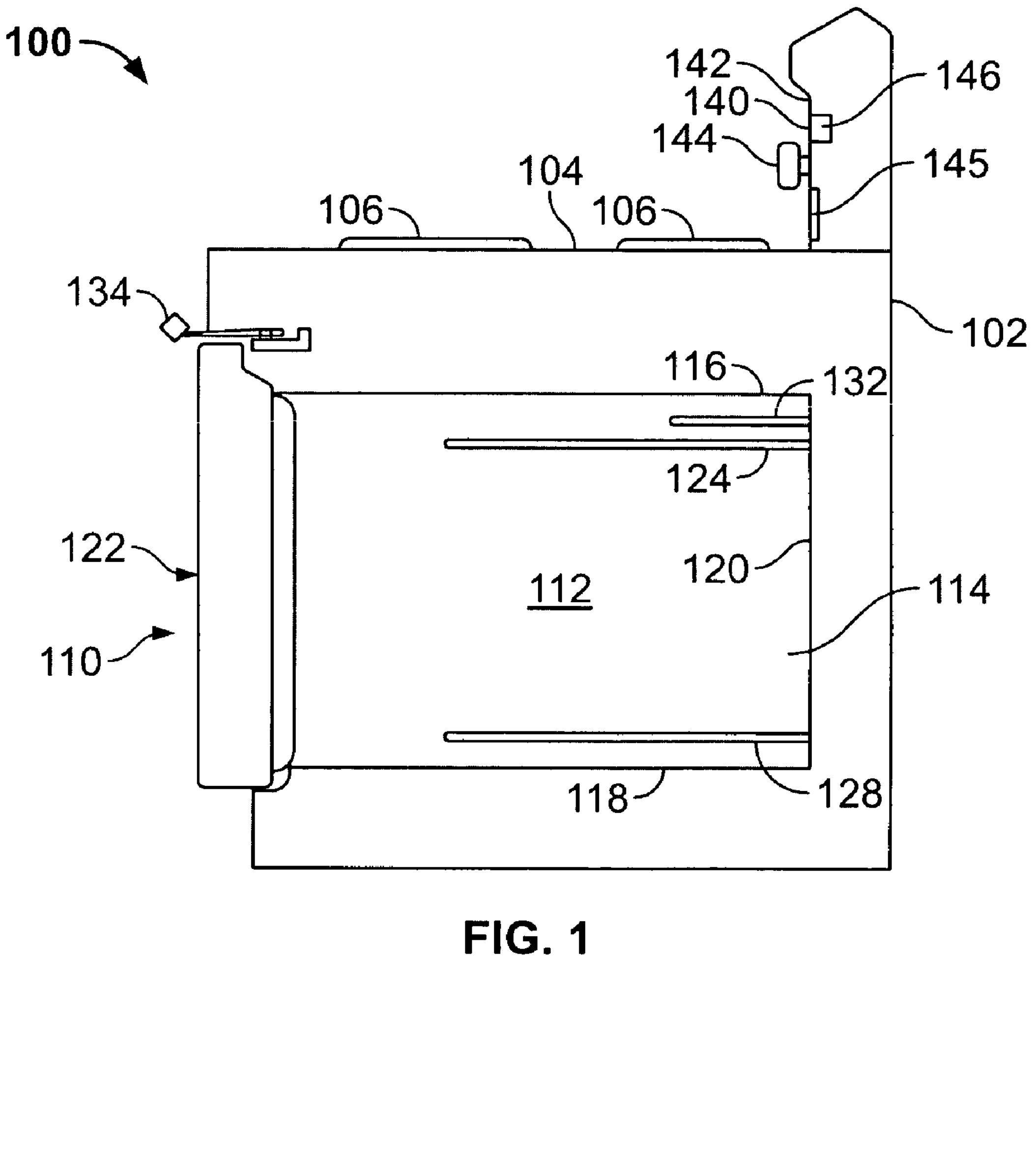
FIG. 1 is a partial sectional view of an exemplary cooking appliance.

FIG. 1 illustrates an exemplary cooking appliance in the form of a free standing range 100 suitable for use with the present invention. Range 100 includes an outer cabinet 102 with a top cooking surface 104 having individual surface heating elements 106, and an electric oven 110 positioned below cooking surface 104. It should be apparent to those skilled in the art and guided by the teachings herein provided that the present invention is applicable, not only to ovens which form the lower portion of a range, such as range 100, but to other forms of heating systems as well, such as, but not limited to, stand alone ovens, and wall-mounted ovens. Further, in alternative embodiments, microwave ovens and other suitable heating ovens are employed in lieu of electric oven 110.

Positioned within outer cabinet 102 is a cooking chamber or cavity 112 defined at least partially by an oven liner having side walls 114, a top wall 116, a bottom wall 118, a rear wall 120 and a front opening 121. A drop door 122 sealingly closes front opening 121 during a cooking process. Cooking cavity 112 is configured to support a food item (not shown), such as, a beef, poultry, pork and/or soup item during a cooking process.

Cooking cavity 112 is provided with at least one upper heating element, such as a broil element 124, positioned at or near top wall 116, and a lower heating element, such as bake element 128, positioned at or near bottom wall 118. In one embodiment, a convection heating element (not shown) is positioned within cooking cavity 112 and configured to generate a heated air flow through cooking cavity 112. Upper heating element 124 and/or lower heating element 128 are energized to heat the food item positioned within cooking cavity 112. In one embodiment, heating elements 124, 128 include electrical heating elements. It should be apparent to those skilled in the art and guided by the teachings herein provided however, that gas-fired heating elements, microwave heating elements and/or other suitable heating elements may be employed in alternative embodiments.

A temperature probe or sensor 132 is mounted with respect to cooking cavity 112 and senses a temperature within cooking cavity 112. In one embodiment, sensor 132 is positioned between broil element 124 and top wall 116. In alternative embodiments, sensor 132 is positioned at any suitable location within cooking cavity 112, such as between broil element 124 and bake element 128. In one embodiment, a door latch 134 is configured to lock door 122 in a closed position during a cooking process and/or a self-cleaning operation.

A control panel 140 is coupled to a backsplash 142 of range 100. At least one control knob 144 is operatively coupled to control panel 140. In one embodiment, control panel 140 includes a plurality of input selectors 145 mounted on an outer surface of control panel 140 and a controller 146 in signal communication with input selectors 145.

In one embodiment, one input selector 145 is labeled as “SLOW COOK” and is actuated to activate a slow cook mode for oven 110. Additionally, at least one input selector 145 is actuated to select a desired cooking power level, such as "HIGH", "MEDIUM", and/or "LOW". As such, a user operates control knob 140 and/or input selectors 145 to input or select operative oven modes or features and/or operational parameters.

Controller 146 controls the operation of range 100 and oven 110 according to the user's selection through control knob 140 and/or input selectors 145. Controller 146 is in signal communication with sensor 132 for receiving signals representative of a detected cavity temperature from sensor 132. Controller 146 is also in operational control communication with broil element 124 and bake element 128 to control the heating operation of broil element 124 and/or bake element 128 during a cooking process.

During a cooking process, the user may initiate the slow cook mode for oven 110 by actuating the corresponding input selector 145. The slow cook mode is defined herein as a process for cooking at least one food item for more than about 2 hours, wherein the slow cook mode has a maximum cooking temperature approximately equal to a maximum cooking temperature for a conventional cooking process, however, the slow cook mode is not operated at the maximum cooking temperature throughout the entire slow cook process.

The user inputs or selects operational parameters for the slow cook mode through control knob 140 and/or input selectors 145. In one embodiment, the user inputs or selects a total operating time and/or an operating time for each process step during the slow cook mode. The user may also input or select a cooking temperature or temperatures and/or a cooking power level, such as a high power level, a medium power level or a low power level. Alternatively, the total operating time, the operating time for each process step, the cooking temperature(s) and/or the cooking power level is programmed by controller 146.

In one embodiment, the user also inputs or selects a food item type, such as beef, poultry, pork and/or soup for the slow cook mode. In this embodiment, the slow cook mode includes several cooking algorithms for different food item types including, without limitation, a beef cooking algorithm, as described in reference to FIG. 2, a poultry cooking algorithm, as described in reference to FIG. 3, a pork cooking algorithm, as described in reference to FIG. 4, and a soup cooking algorithm, as described in reference to FIG. 5. Controller 146 activates the corresponding cooking algorithm to operate or execute the slow cook mode in response to the selected food item type.

Figure 2:
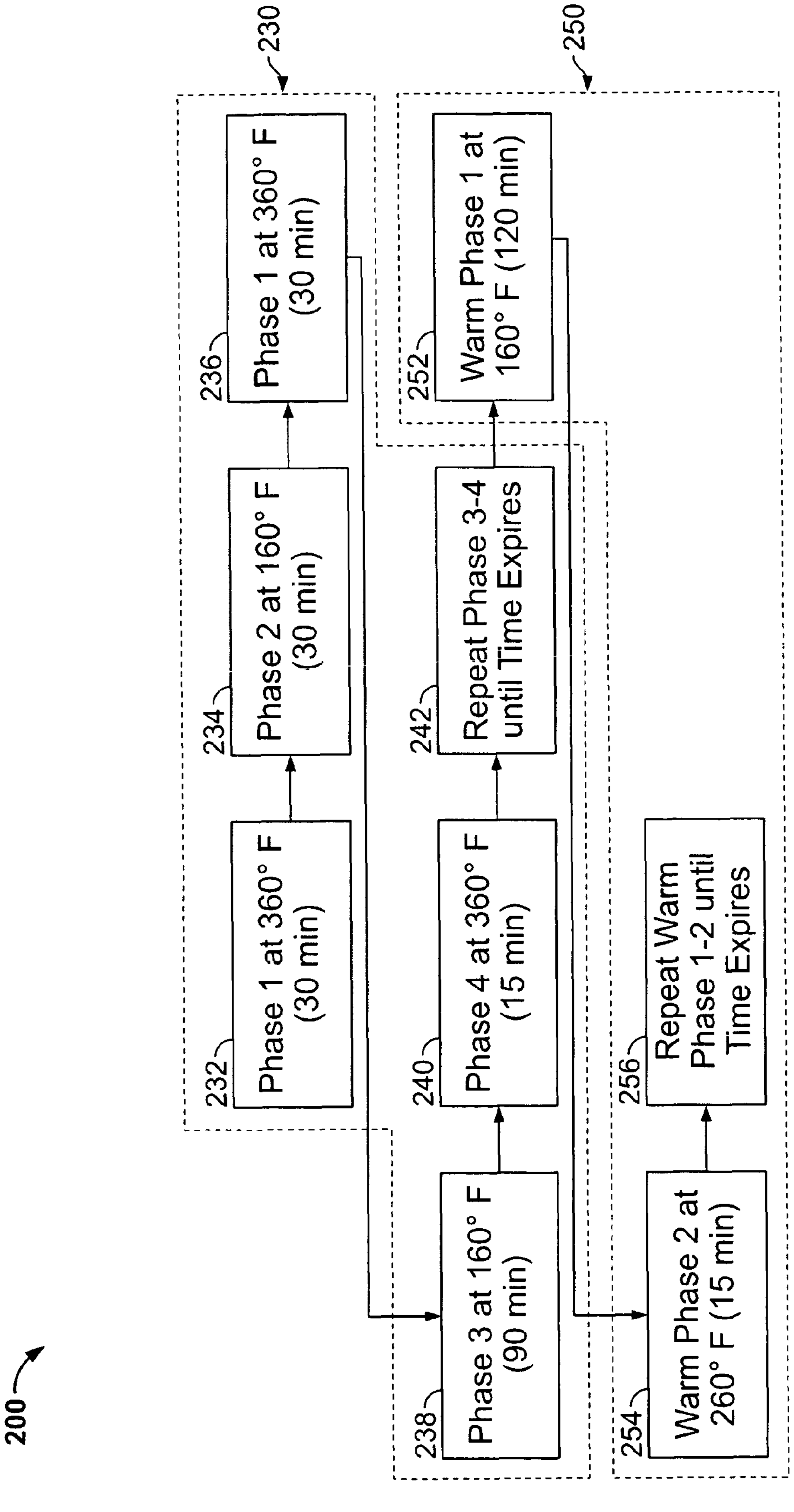
FIG. 2 is a flow chart of an exemplary beef cooking algorithm for a slow cook mode suitable for use with the cooking appliance shown in FIG. 1.

FIG. 2 is a flow chart for an exemplary beef cooking algorithm 200 of the slow cook mode suitable for use in cooperation with oven 110 shown in FIG. 1. Upon selection of a beef food item type, controller 146 performs beef cooking algorithm 200 in the slow cook mode.

Controller 146 operates a slow cook process 230 including a plurality of cooking phases, such as a plurality of slow cook phases. Controller 146 operates 232 a first slow cook phase, operates 234 a second slow cook phase, and operates 236 the first slow cook phase again. Controller 146 heats cooking cavity 112 to a first cooking temperature for a first cooking time in the first slow cook phase. Controller 146 heats cooking cavity 112 to a second cooking temperature for a second cooking time in the second slow cook phase. In one embodiment, the first cooking temperature is different than the second cooking temperature. In a particular embodiment, the first cooking temperature is about 360° F., the second cooking temperature is about 160° F., and the first cooking time and the second cooking time are about 30 minutes. It is apparent to those skilled in the art and guided by the teachings herein provided that the cooking temperatures and/or the cooking times as described herein can be varied in alternative embodiments in accordance with user selection and/or user preference.

Controller 146 then 238 operates a third slow cook phase, and operates 240 a fourth slow cook phase. Controller 146 heats cooking cavity 112 to a third cooking temperature for a third cooking time in the third slow cook phase, and heats cooking cavity 112 to a fourth cooking temperature for a fourth cooking time in the fourth slow cook phase. In one embodiment, the third cooking temperature is different than the fourth cooking temperature, and the third cooking time is different than the fourth cooking time. In a particular embodiment, the third cooking temperature is about 160° F., the fourth cooking temperature is about 360° F., the third cooking time is about 90 minutes, and the fourth cooking time is about 15 minutes.

Controller 146 alternately operates 242 at least two of the first, second, third and fourth slow cook phases until an inputted or programmed slow cook process time expires. In one embodiment, controller 146 repeats the third and the fourth slow cook phase to complete cooking process 230. In alternative embodiments, controller 146 is configured to repeat the slow cook phases in any suitable sequence, such as from the first to the second slow cook phase, from the first to the fourth slow cook phase, or from the second to the fourth slow cook phase during step 242. As such, at least two corresponding cooking temperatures of the repeated slow cook phases are different. Additionally, at least two corresponding cooking times of the repeated slow cook phases may also be different.

Upon completion of slow cook process 230, controller 146 operates a warming process 250. Controller 146 operates 252 a first warming phase, and then operates 254 a second warming phase. Controller 146 heats cooking cavity 112 to a first temperature for a first time period in the first warming phase, and heats cooking cavity 112 to a second temperature for a second time period in the second warming phase. In one embodiment, the first temperature is different than the second temperature, and the first time period is different than the second time period. In a particular embodiment, the first temperature is about 160° F., the second temperature is about 260° F., the first time period is about 120 minutes, and second time period is about 15 minutes.

Controller 146 repeats 256 the first and the second warming phase until an inputted or programmed total operating time expires to terminate the slow cook mode. Alternatively, controller 146 may terminate the slow cook mode upon selection of an input selector 145 labeled "CLEAR" configured to clear or discontinue the selected slow cook mode. In one embodiment, controller 146 terminates the slow cook mode upon expiration of a maximum time period. The maximum time may be predetermined by controller 146 corresponding to the inputted cooking power level, as described in greater detail below.

In one embodiment, the slow cook mode is operatable in a high power level and a lower power level. Controller 146 varies the operating parameters of the slow cook mode based on the inputted or selected power level. The high power level is defined herein as a power level including at least one of a first, second, third and fourth cooking temperature greater than a corresponding cooking temperature for the lower power level in the slow cook mode. In a particular embodiment, the high power level includes a cooking temperature from about 300° F. to about 350° F., and the lower power level includes a cooking temperature from about 250° F. to about 300° F. In a further embodiment, the high power level also includes at least one of a first, second, third and fourth cooking time period shorter than a corresponding cooking time period for the lower power level in the slow cook mode. In still a further embodiment, the high power level sets a maximum time period shorter than a maximum time period set for the low power level. Specifically, the high power level sets the maximum time period at about 8 hours, and the lower power level sets the maximum time period at about 12 hours.

Controller 146 operates broil element 124, bake element 128, and/or the convection heating element (not shown) to heat cooking cavity 112 in each cooking or warming phase. In one embodiment, warming process 250 is operated at a temperature not greater than about 280° F. In a further embodiment, the slow cook mode is operated at a temperature not greater than about 400° F. throughout the entire process. In one embodiment, controller 146 operates the slow cook mode to cook the food item for about 3 hours to about 12 hours.

It should be apparent to those skilled in the art and guided by the teachings herein provided that the slow cook mode may be executed without at least one of steps 212 through 256 in alternative embodiments. Further, in alternative embodiments, the heating temperature and/or the heating time period for each step may be varied based on different power levels, food item types, heating systems and/or cooking purposes.

Figure 3:
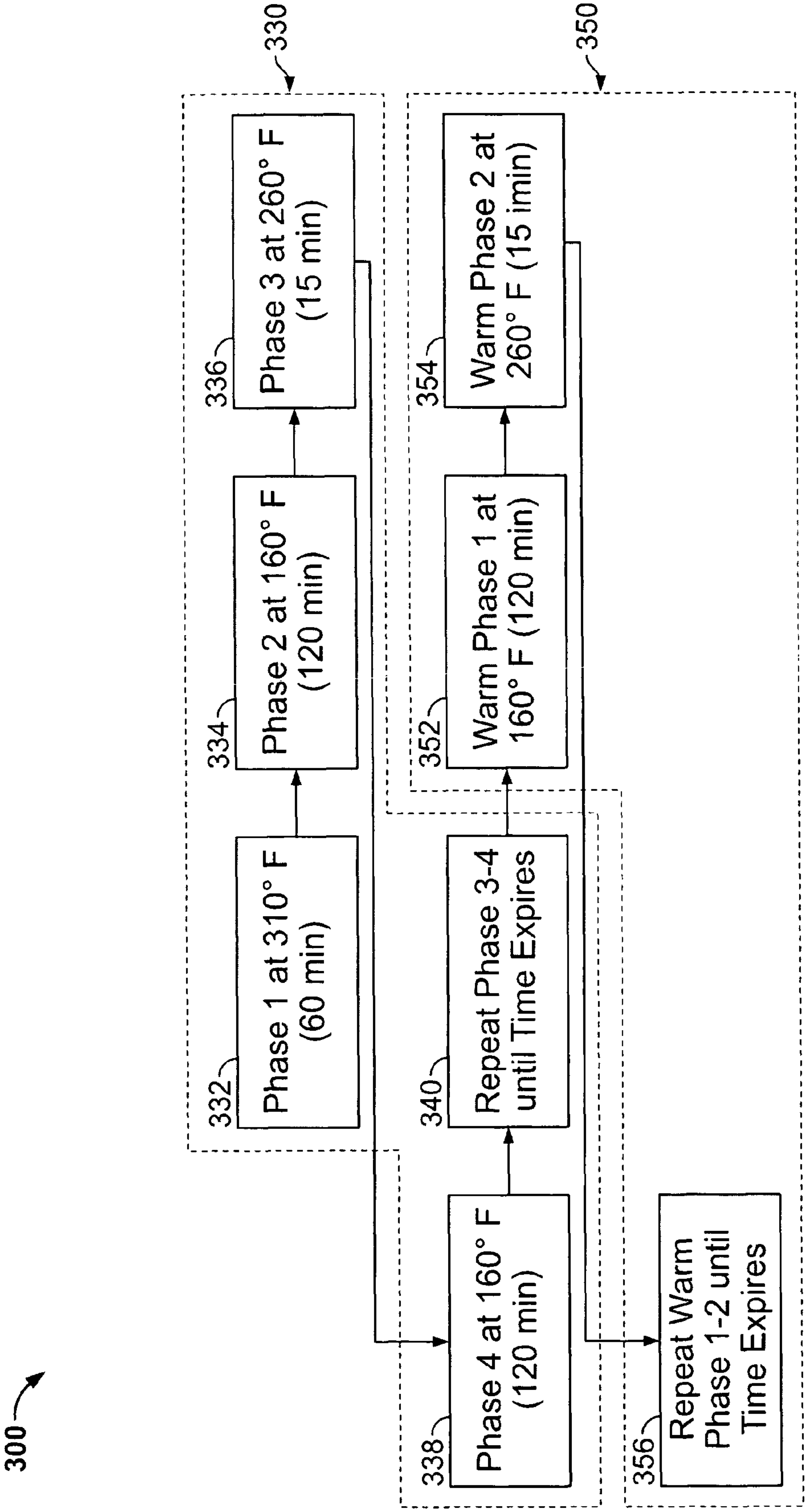
FIG. 3 is a flow chart of an exemplary poultry cooking algorithm for the slow cook mode suitable for use with the cooking appliance shown in FIG. 1.

FIG. 3 is a flow chart for an exemplary poultry cooking algorithm 300 of the slow cook mode suitable for use in cooperation with oven 110 shown in FIG. 1. Upon selection of a poultry food item type, controller 146 performs poultry cooking algorithm 300 in the slow cook mode.

Controller 146 operates 332 a first slow cook phase, operates 334 a second slow cook phase, operates 336 a third slow cook phase, and operates 338 a fourth slow cook phase in a similar manner as in beef cooking algorithm 200. In a particular embodiment, a first cooking temperature is about 310° F. and a first cooking time is about 60 minutes; in the second slow cook phase a second cooking temperature is about 160° F. and a second cooking time is about 120 minutes; in the third slow cook phase a third cooking temperature is about 260° F. and a third cooking time is about 15 minutes; and in the fourth slow cook phase a fourth cooking temperature is about 160° F. and a fourth cooking time is about 120 minutes.

Controller 146 repeats 340 the third slow cook phase and the fourth slow cook phase until an inputted or programmed cooking process time expires. Controller 146 then operates a warming process 350 substantially similar to warming process 250, as shown in FIG. 2, for beef cooking algorithm 200. In a particular embodiment, controller 146 operates 352 a first warming phase to maintain cooking cavity 112 at a temperature of about 160° F. for about 120 minutes, operates 354 a second warming phase to maintain cooking cavity 112 at a temperature of about 260° F. for about 15 minutes. Controller 146 repeats 356 the first and the second warm phase until the slow cook mode terminates. It is apparent to those skilled in the art and guided by the teachings herein provided that the cooking temperatures and/or the cooking times as described herein can be varied in alternative embodiments in accordance with user selection and/or user preference.

Figure 4:
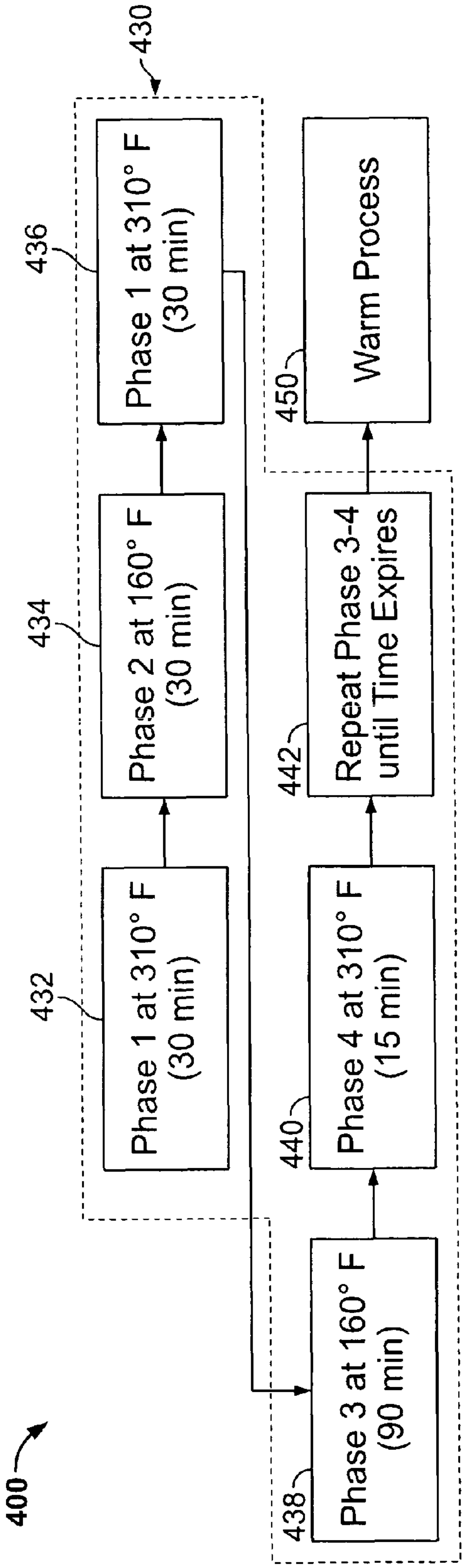
FIG. 4 is a flow chart of an exemplary pork cooking algorithm for the slow cook mode suitable for use with the cooking appliance shown in FIG. 1.

FIG. 4 is a flow chart for an exemplary pork cooking algorithm 400 of the slow cook mode suitable for use in cooperation with oven 110 shown in FIG. 1. Upon selection of a pork food item type, controller 146 operates pork cooking algorithm 400 in the slow cook mode.

Controller 146 operates a slow cook process 430. During slow cook process 430, controller 146 operates 432 a first slow cook phase, operates 434 a second slow cook phase, repeats operation 436 of the first slow cook phase, operates 438 a third slow cook phase and operates 440 a fourth slow cook phase in a similar manner as in beef cooking algorithm 200. In a particular embodiment, in the first slow cook phase a first cooking temperature is set at a temperature of about 310° F. and a first cooking time is set at about 30 minutes; in a second slow cook phase a second cooking temperature is set at a temperature of about 160° F. and a second cooking time is set at about 30 minutes; in a third slow cook phase a third cooking temperature is set at a temperature of about 160° F. and a third cooking time is set at about 90 minutes; and in the fourth slow cook phase a fourth cooking temperature is set at a temperature of about 310° F. and a fourth cooking time is set at about 15 minutes. Controller 146 repeats 442 the third slow cook phase and the fourth slow cook phase to complete cooking process 430. Controller 146 then operates a warming process 450 substantially similar to warming process 250, as shown in FIG. 2, to complete the slow cook mode.

Figure 5:
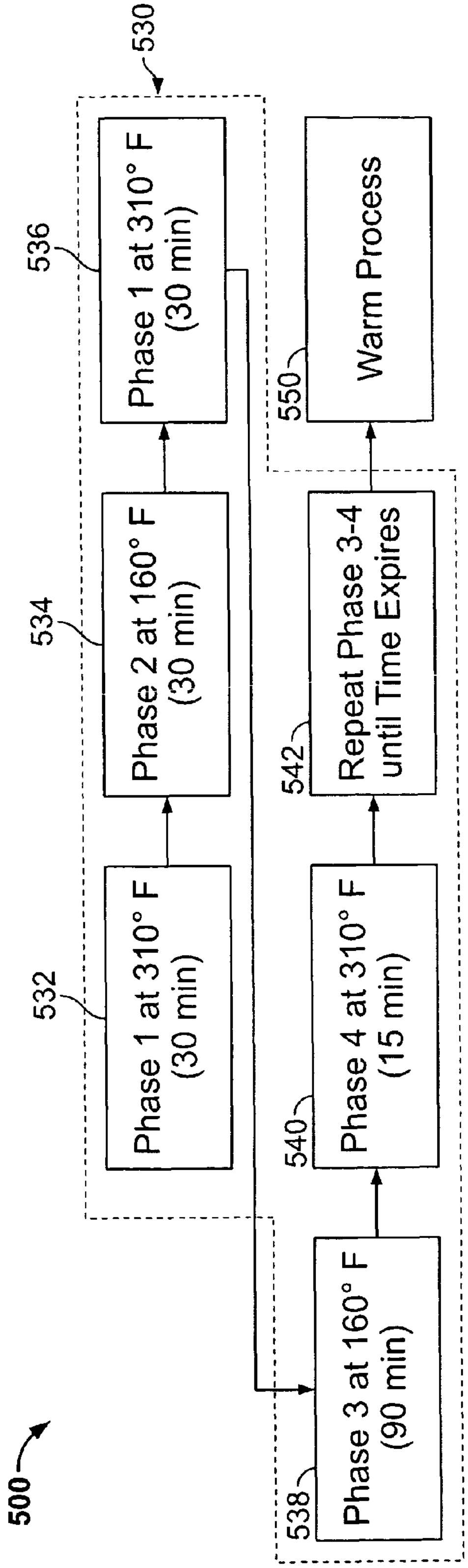
FIG. 5 is a flow chart of an exemplary soup cooking algorithm for the slow cook mode suitable for use with the cooking appliance shown in FIG. 1.

FIG. 5 is a flow chart for an exemplary soup cooking algorithm 500 of the slow cook mode suitable for use in cooperation with oven 110 shown in FIG. 1. Upon selection of a soup food item type, controller 146 performs soup cooking algorithm 500 in the slow cook mode.

Controller 146 operates a slow cook process 530. During slow cook process 530, controller 146 operates 532 a first slow cook phase, operates 534 a second slow cook phase, repeats operation 536 of the first slow cook phase again, operates 538 a third slow cook phase, and operates 540 a fourth slow cook phase in a similar manner as beef cooking algorithm 200. In a particular embodiment, the first cooking temperature is set at a temperature of about 310° F. and a first cooking time is set at about 30 minutes; in a second slow cook phase a second cooking temperature is set at a temperature of about 160° F. and a second cooking time is set at about 30 minutes; in a third slow cook phase a third cooking temperature is set at a temperature of about 160° F. and a third cooking time is set at about 90 minutes; and in the fourth slow cook phase a fourth cooking temperature is set at a temperature of about 310° F. and a fourth cooking time is set at about 15 minutes. Controller 146 repeats 542 the third slow cook phase and the fourth slow cook phase to complete cooking process 530, and then operates a warming process 550 substantially similar to warming process 250, as shown in FIG. 2, to complete the slow cook mode.

It should be apparent to those skilled in the art and guided by the teachings herein provided that the above-described slow cook algorithms of the slow cook mode may be executed, in alternative embodiments, with the exclusion of any process step described in the exemplary embodiment. Further, the heating temperature and/or the heating time period for each described process step may be varied based on different operating power levels, food item types, heating systems and/or cooking purposes or preferences.

While the invention has been described in terms of various specific embodiments, those skilled in the art will recognize that the invention can be practiced with modification within the spirit and scope of the claims.

What is claimed is:

1. A heating system for a cooking appliance, the cooking appliance comprising a cabinet defining a cooking cavity, the cooking cavity configured to support a food item therein during a cooking process, said heating system comprising:

at least one heating element positioned within said cooking cavity; and a controller in operational control communication with said at least one heating element, said controller configured to energize said at least one heating element to operate a slow cook mode for cooking the food item, said controller further configured to operate said at least one heating element during the slow cook mode in at least one cooking phase for more than about 2 hours to facilitate automatically cycling a temperature of the cooking cavity between at least a first cooking temperature set point and a second cooking temperature set point different from the first cooking temperature set point.

2. A heating system in accordance with claim 1 wherein said controller is configured to operate a slow cook process having a first cooking phase and a second cooking phase in the slow cook mode, said controller is configured to heat said cooking cavity to a first cooking temperature for a first cooking time in the first cooking phase and to heat said cooking cavity to a second cooking temperature for a second cooking time in the second cooking phase, the first cooking temperature different than the second cooking temperature.

3. A heating system in accordance with claim 2 wherein said controller is configured to operate a third cooking phase and a fourth cooking phase in the slow cook process, said controller is configured to heat said cooking cavity to a third cooking temperature for a third cooking time in the third cooking phase and to heat said cooking cavity to a fourth cooking temperature for a fourth cooking time in the fourth cooking phase, the third cooking temperature different than at least one of the first cooking temperature, the second cooking temperature and the fourth cooking temperature, and the third cooking time different than at least one of the first cooking time, the second cooking time and the fourth cooking time.

4. A heating system in accordance with claim 3 wherein said controller is configured to alternately operate at least two of the first cooking phase, the second cooking phase, the third cooking phase and the fourth cooking phase during the cooking process, at least two corresponding cooking temperatures of the alternately operated cooking phases are different, and at least two corresponding cooking times of the alternately operated cooking phases are different.

5. A heating system in accordance with claim 1 wherein said controller is configured to operate the slow cook mode in at least one of a high power level and a low power level.

6. A heating system in accordance with claim 2 wherein said controller is configured to operate a warming process after the slow cook process in the slow cook mode, said controller is configured to heat said cooking cavity to a temperature not greater than about 280° F. during the warming process.

7. A heating system in accordance with claim 1 wherein said controller is configured to operate the slow cook mode for about 3 hours to about 12 hours.

8. A cooking appliance comprising:

- a cabinet at least partially defining a cooking cavity, said cooking cavity configured to support a food item therein during a cooking process;
- at least one heating element positioned within said cooking cavity;
- a temperature sensor positioned with respect to said cooking cavity and configured to detect a temperature within said cooking cavity; and
- a controller operatively coupled to said at least one heating element and said temperature sensor, said controller configured to energize said at least one heating element to operate in a slow cook mode for cooking the food item within said cooking cavity, said controller further configured to operate said at least one heating element during the slow cook mode in at least one cooking phase for more than about 2 hours to facilitate automatically cycling a temperature of the cooking cavity between at least a first cooking temperature set point and a second cooking temperature set point different from the first cooking temperature set point.

9. A cooking appliance in accordance with claim 8 wherein said controller is configured to energize said at least one heating element to heat said cooking cavity to a temperature not greater than about 400° F. in the slow cook mode.

10. A cooking appliance in accordance with claim 8 wherein said controller is configured to operate the slow cook mode having a first cooking phase and a second cooking phase, said controller is configured to heat said cooking cavity to a first cooking temperature for a first cooking time in the first cooking phase and to heat said cooking cavity to a second cooking temperature for a second cooking time in the second cooking phase, the first cooking temperature different than the second cooking temperature.

11. A cooking appliance in accordance with claim 10 wherein said controller is configured to operate a third cooking phase and a fourth cooking phase, and said controller is configured to heat said cooking cavity to a third cooking temperature for a third cooking time in the third cooking phase and to heat said cooking cavity to a fourth cooking temperature for a fourth cooking time in the fourth cooking phase, the third cooking temperature different than the fourth cooking temperature and the third cooking time different than the fourth cooking time.

12. A cooking appliance in accordance with claim 11 wherein said controller is configured to alternately operate the third cooking phase and the fourth cooking phase.

13. A cooking appliance in accordance with claim 8 wherein said controller is configured to operate the slow cook mode in at least one of a high power level and a low power level.

14. A cooking appliance in accordance with claim 8 wherein said controller is configured to operate a warming process in the slow cook mode, said controller is configured to heat said cooking cavity to a temperature below about 280° F.

15. A cooking appliance in accordance with claim 8 wherein said controller is configured to operate the slow cook process for about 3 hours to about 12 hours.

16. A method for operating a cooking appliance, said method comprising:

- providing a cabinet at least partially defining a cooking cavity, the cooking cavity configured to receive a food item therein;
- positioning at least one heating element within the cooking cavity;
- operatively coupling a controller to the at least one heating element, the controller configured to energize the at least one heating element to operate in a slow cook mode for cooking the food item within the cooking cavity; and
- heating the cooking cavity in at least one cooking phase for more than about 2 hours, wherein a temperature of the cooking cavity is automatically cycled between at least a first cooking temperature set point and a second cooking temperature set point different from the first cooking temperature set point.

17. A method in accordance with claim 16 further comprising operating the appliance in a slow cook mode having a first cooking phase and a second cooking phase, wherein the cooking cavity is heated to a first cooking temperature for a first cooking time in the first cooking phase, and the cooking cavity is heated to a second cooking temperature for a second cooking time in the second cooking phase, the first cooking temperature different than the second cooking temperature.

18. A method in accordance with claim 17 further comprising operating a third cooking phase and a fourth cooking phase, wherein the cooking cavity is heated to a third cooking temperature for a third cooking time in the third cooking phase, and the cooking cavity is heated to a fourth cooking temperature for a fourth cooking time in the fourth cooking phase, the third cooking temperature different than the fourth cooking temperature and the third cooking time different than the fourth cooking time.

19. A method in accordance with claim 18 further comprising alternately operating the third cooking phase and the fourth cooking phase during the slow cook mode.

20. A method in accordance with claim 16 further comprising operating the slow cook mode for about 3 hours to about 12 hours.

* * * * *